United States Patent [19]

Jones

[11] Patent Number: 5,796,956
[45] Date of Patent: Aug. 18, 1998

US005796956A

[54] ATM CELL SWITCH

[75] Inventor: Trevor Jones, Maldon, United Kingdom

[73] Assignee: General DataComm Advanced Research Centre limited, Essex, United Kingdom

[21] Appl. No.: 406,300

[22] Filed: Mar. 17, 1995

[51] Int. Cl.$^6$ ................................................. G06F 13/00
[52] U.S. Cl. ............................... 395/200.63; 395/200.65
[58] Field of Search .................. 395/200.01, 200.63, 395/200.65

[56] References Cited

U.S. PATENT DOCUMENTS

| | | | |
|---|---|---|---|
| 5,278,827 | 1/1994 | Pound | 370/84 |
| 5,295,135 | 3/1994 | Kammerl | 370/17 |
| 5,339,332 | 8/1994 | Kammerl | 375/10 |
| 5,361,252 | 11/1994 | Sallberg | 370/17 |
| 5,402,426 | 3/1995 | Fogler | 371/20.1 |
| 5,418,777 | 5/1995 | Worster | 370/17 |
| 5,448,567 | 9/1995 | Dighe | 370/94.2 |
| 5,487,072 | 1/1996 | Kant | 371/32 |
| 5,497,375 | 3/1996 | Huchyj | 370/94.1 |

FOREIGN PATENT DOCUMENTS

WO 93/11622   10/1993   WIPO .

*Primary Examiner*—Eric Coleman
*Attorney, Agent, or Firm*—David P. Gordon; Thomas A. Gallagher

[57] ABSTRACT

An ATM cell switch includes a plurality of link controllers, each of which has a leaky bucket processor to monitor and control cell flow rates. Each of the leaky bucket processors includes a pair of buckets. Each processor times the arrival of each ATM cell in the respective link controller, calculates the time interval between the reception of two consecutive cells on the same connection, simultaneously determines the resultant level in both of the buckets from the calculated time interval and a stored predetermined regular bucket increment, compares the resultant level with a predetermined maximum level, and discards or changes the CLP of the current cell if the resultant level exceeds the predetermined maximum. According to a preferred embodiment of the invention, timing is effected with a 32-bit timer, but only the least significant 16-bits are used to time stamp cells. The time interval between two cells is calculated with two 16-bit adder/subtractors and two 16-bit buckets are thereby simultaneously controlled. The 32-bit routing table data is split into 16 lsb and 16 msb which are directed to respective of the adder/subtractors. A sequence of simultaneous operations in each of the adder/subtractors determine the eligibility of cells and the resultant bucket levels.

6 Claims, 6 Drawing Sheets

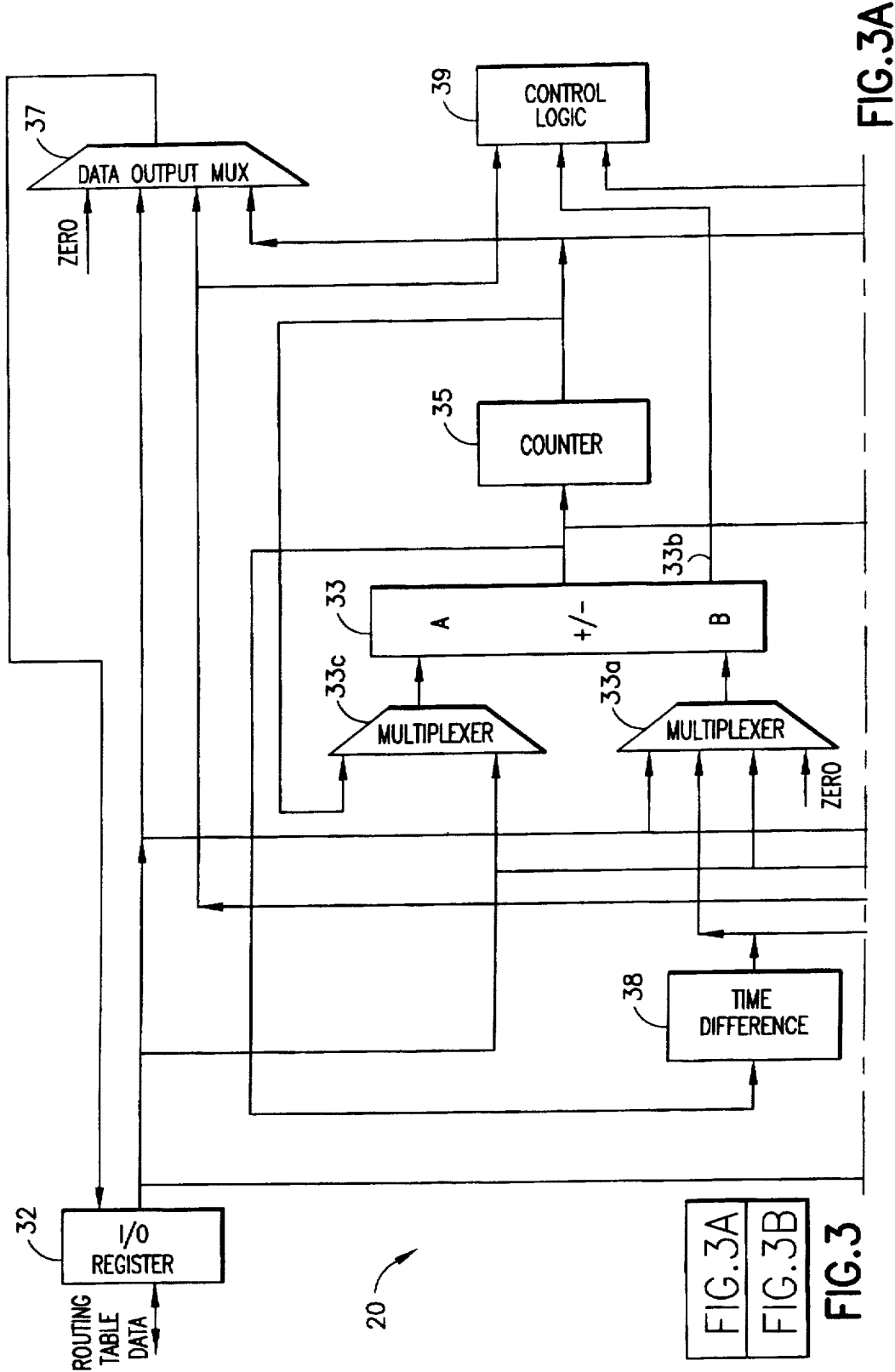

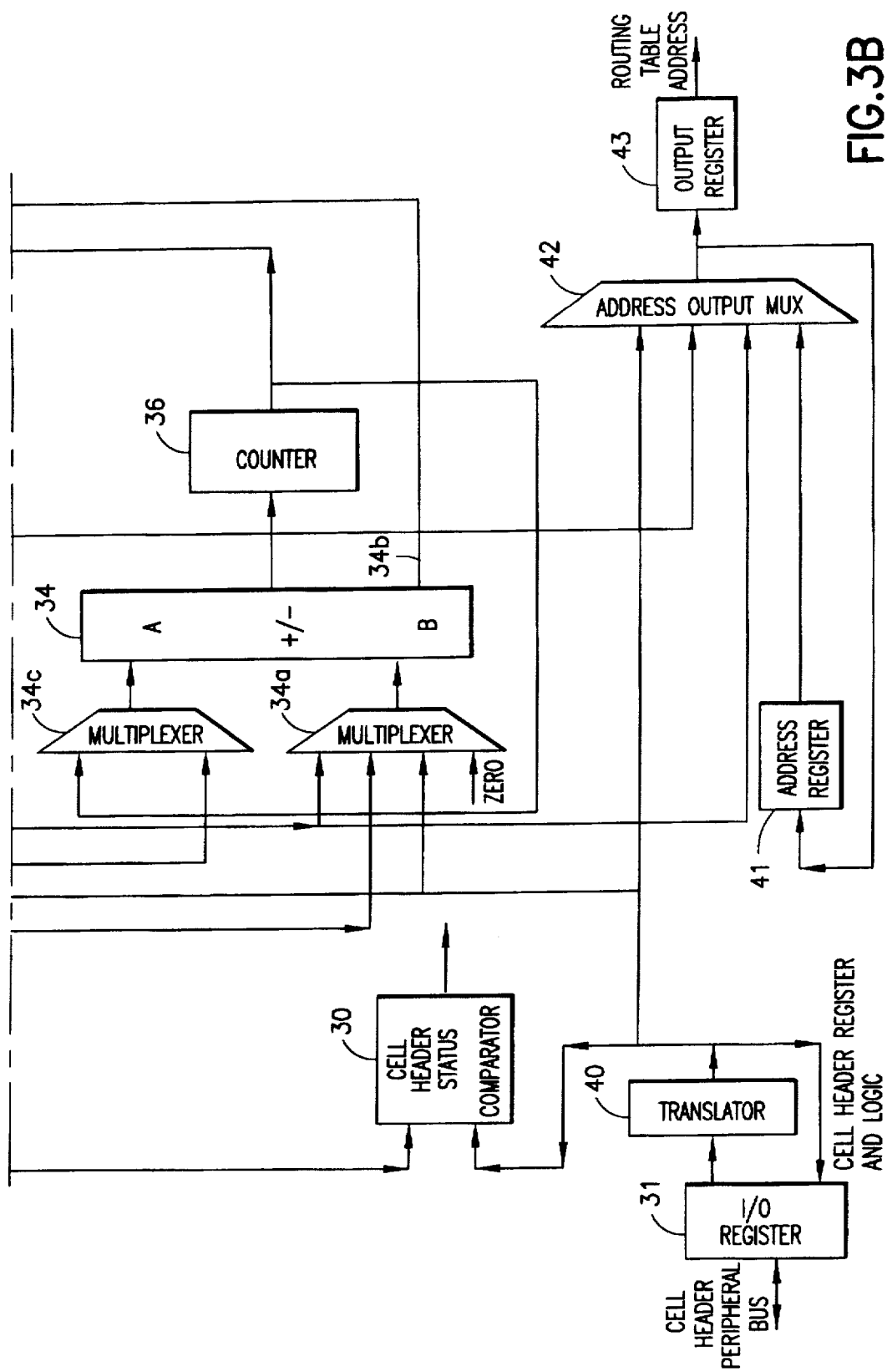

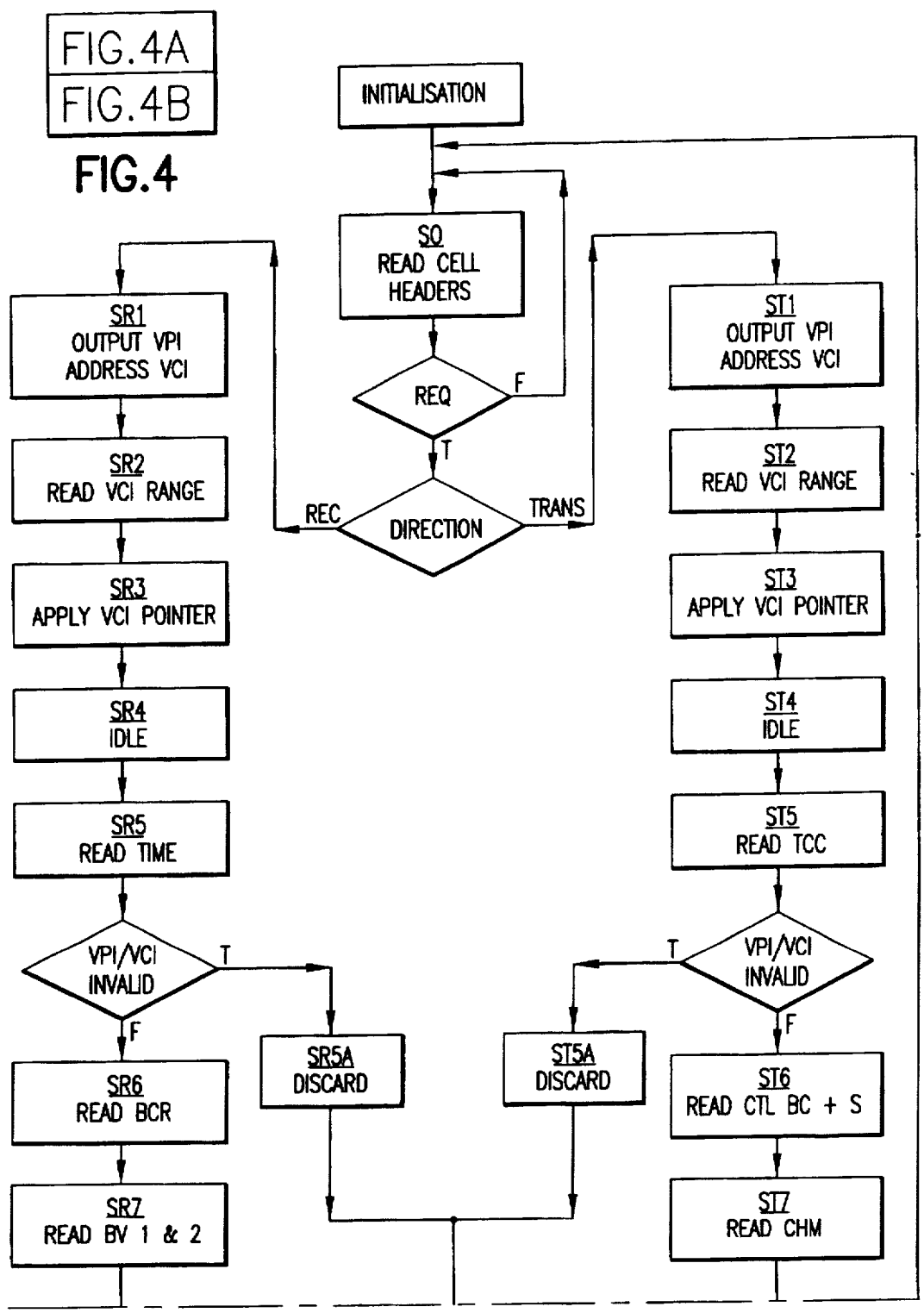

ATM CELL SWITCH

FIELD OF THE INVENTION

This invention relates to an Asynchronous Transfer Mode (ATM) cell switch for use, for example, in switching cells of data between a plurality of data links. The cell switch employs a controller for cell header translation and traffic policing to regulate the flow of data.

BACKGROUND TO THE INVENTION

The ATM FORUM specification defines criteria for traffic control and congestion control for B-ISDN (Broadband Integrated Services Digital Network). ATM Layer Congestion is defined as a state of Network Elements (e.g. switches, concentrators, cross-connects, and transmission links) in which the network is not able to meet the negotiated Network Performance objectives for the already established connections. In general, ATM Layer congestion can be caused both by unpredictable statistical fluctuation of traffic flows, and by fault conditions within the network.

Generally, there are three types of ATM cell: CLP0 (Cell Loss Priority), which are the higher priority cells; CLP1, which have a lower priority, and can therefore be discarded in preference to CLP0 cells; and OAM (Operations And Maintenance) cells, whose function is to maintain connections and perform general network management tasks—they do not form part of the data being transmitted. For the purposes of the present invention, only the first two types of cell will be considered.

Two different types of bandwidth requirement have to be policed in a typical ATM network: Peak rate and Sustained rate. The sustained rate policing looks at the average data rate for a particular connection to see that the agreed average bandwidth has not been exceeded, while the peak rate is arranged to look at bursts of data, typically allowing a peak rate in excess of the sustained rate.

In managing congestion, a Network Element may selectively discard cells with low priority if necessary to protect as far as possible the Network Performance for cells with high priority. Network cell switches are required to regulate congestion by discarding cells which do not conform with the predetermined cell flow rates for that user, which will take account of cell priority.

To do this, the cell processor in the switch typically employs a continuous-state leaky bucket algorithm, which can be viewed as a finite-capacity bucket whose real-valued content drains out at a continuous rate of 1 unit of content per time-unit, and whose content is increased by the increment I for each cell which conforms with the agreed rate—sustained or peak, as appropriate. This is referred to as a "conforming cell".

Alternatively, the leaky bucket algorithm can be viewed as the work load in a finite-capacity queue, or as a real-valued counter.

If at a cell arrival the content of the bucket is less than or equal to the limit value, L, which is set at less than the bucket capacity, then the cell is conforming. Otherwise, the cell is non-conforming. The capacity of the bucket (the upper bound on the counter) is L+I.

For each bucket, there are three parameters: Current Bucket Level; Bucket Maximum Level; and Bucket Increment. In addition, there is a fourth parameter which is global to all the buckets, the Time Stamp. The Current Bucket Level is an integer variable which is analogous to the amount of water in the leaky bucket at the current time. The Bucket Maximum Level is a measure of the size of the bucket. In the context of ATM, it is a measure of the burst size of traffic that can be handled, and will be set according to the available bandwidth and the type of traffic. The Bucket Increment is the addition to the content of the bucket represented by each new cell. The bucket has a constant drain rate—in a unit time, the bucket will decrement by one unit. The Time Stamp is used to calculate the amount of drain. In the leaky bucket algorithm, one only looks at the bucket values when a cell comes in. The time difference of the arrival of cells on the same connection is measured, and this gives the "drop in level" of the bucket. The cell arrival time or time stamp is recorded along with the other values in the Routing Table RAM, for example.

FIG. 1 illustrates a standard continuous-state leaky bucket algorithm. The first stage 1 represents the arrival of a cell k at time $t_a(k)$. Initially, at the arrival of the first cell at time $t_a(1)$, the content X of the bucket is set to zero, and the last conformance time (LCT) is set to $t_a(1)$.

At the arrival time of the $k^{th}$ cell, $t_a(k)$, the next stage 2 of the algorithm provisionally updates the content of the bucket to the value X', which equals the content of the bucket X after the arrival of the last conforming cell minus the amount the bucket has drained since that arrival. The value of X' is then tested at 3 to determine whether it is negative, and if it is the value of X' is set at 4 to zero, since it cannot in reality be a negative value. The cell is then designated at 5 as conforming, the value of the bucket content X is set to X' plus the increment, which in this case will mean simply the increment, and the LCT is set at $t_a(k)$.

If X' is not negative, stage 6 tests whether X' is greater than the limit value L. If the result is positive, the cell is non-conforming (7) and the values of X and LCT are not changed. If X' is less than or equal to the limit value L, the cell is conforming, and at stage 5 the bucket content X is again set to X' plus the increment I for the current cell, and the last conformance time LCT is set to the current time $t_a(k)$.

Typically, more than one bucket will be employed, to monitor different aspects of the traffic, for example one bucket will monitor peak flow, while another will monitor the average flows. It may be desirable to employ several buckets to provide a more precise policing of cell traffic. Conventionally, the buckets are operated in sequence, with, for example, the first bucket monitoring peak flow, and the next bucket monitoring the average flow. When a bucket overflows, it can either discard all cells, or discard CLP0 cells and change the CLP1 cells to CLP0 cells, a process referred to as "tagging". A problem with operating in sequence, or cascading, is that the delay due to the need to complete one bucket's processing before starting the next may adversely affect the performance of the switch. Reducing the delay is conventionally achieved by faster processing, which requires more complex and expensive hardware.

An object of the present invention is to provide different implementations of the leaky bucket algorithm in an ATM switch cell processor which are rapid in operation without requiring large and costly processing hardware.

SUMMARY OF THE INVENTION

According to the invention there is provided an ATM cell switch comprising a plurality of data input/output link controllers connected to external data links, each link controller comprising a leaky bucket processor to monitor and control cell flow rates, the leaky bucket processor comprising timer means for timing the arrival of each ATM cell, and calculating means to calculate the time interval between the reception of two consecutive cells on the same connection, means for storing a predetermined regular bucket increment, means for determining from the calculated time interval and from the predetermined regular bucket increment the resultant level in the bucket, and means for comparing the resultant level in the bucket with a predetermined maximum level and, if the maximum level will be exceeded, for discarding, or changing the Cell Loss Priority of, the current cell, characterised in that the leaky bucket processor comprises means for performing the calculation of the resultant bucket level for a pair of buckets simultaneously. For example, the buckets can be for monitoring peak and average cell flows respectively.

Preferably, the leaky bucket processor comprises means for carrying out the following steps upon receipt of a cell on a connection:

a) simultaneously recalculate the level values for a pair of different buckets in parallel;

b) determine for each of the buckets whether the predetermined level has been exceeded;

c) determine whether each bucket is valid for the current cell;

d) determine whether the increment value should be added to the bucket value before writing back the new value to the bucket; and e) determine whether the cell is to be discarded and, if not, whether the Cell Priority is to be changed The timer means suitably provides 32-bit time values, the time difference being calculated using only the 16 least significant bits.

The leaky bucket processor preferably comprises two 16-bit adder/subtractors, to calculate the time interval between reception of two cells on the same connection, and two magnitude comparators to compare the new levels of the buckets with the maximum permitted levels and to signal that the cell should be discarded if the maximum permitted level would be exceeded by inclusion of that cell.

The invention also provides an ATM cell header translator comprising means for processing cell header data for each incoming cell to determine how the cell should be handled in the switch, the processing means comprising a header processor, means for reading the cell header for each incoming cell and for passing the data to the header processor, FIFO register means for receiving the cell whose header has been read, and means for writing new destination header data to the cell as it emerges from the FIFO register means.

The invention further provides a method of leaky bucket processing in an ATM cell switch, the method comprising:

a) simultaneously recalculating the level values for a pair of different buckets in parallel;

b) determining for each of the buckets whether the predetermined level has been exceeded;

c) determining whether each bucket is valid for the current cell;

d) determining whether the increment value should be added to the bucket value before writing back the new value to the bucket; and e) determining whether the cell is to be discarded and, if not, whether the Cell Priority is to be changed.

The ATM cell switch is suitable, for example, for operating on two bi-directional 155 Mbit/sec data links.

BRIEF DESCRIPTION OF THE DRAWINGS

In the drawings:

FIG. 3 is a block diagram of the cell processor forming part of the switch of FIG. 2.

DETAILED DESCRIPTION OF THE ILLUSTRATED EMBODIMENTS

In general, the sequence of operations of the leaky bucket processor is as follows (a more detailed description is given hereinafter with reference to the Figures):

(a) Wait for a cell to arrive on a given connection;

(b) When a cell arrives, look for the time stamp for the previous cell on the same connection;

(c) Subtract the previous cell time stamp value from the current time to give the time difference;

(d) Read the current bucket level from the RAM—this is the level after the last cell came in;

(e) Subtract the time difference calculated at (c) from the previous bucket level obtained at (d). This gives the new bucket level. If the result is negative, the new bucket level is set at zero;

(f) Read the bucket maximum value (the configured maximum value);

(g) Compare the new bucket level calculated in (e) with the value from (f);

(h) Assess the eligibility of the new cell to decide whether the cell should have gone into the bucket.

The eligibility requirements are different for each bucket. In each bucket, the cell is only passed if: (a) the bucket does not overflow; (b) the cell was not eligible for the bucket; or (c) the bucket does overflow and the cell priority has been changed.

Figure 2:
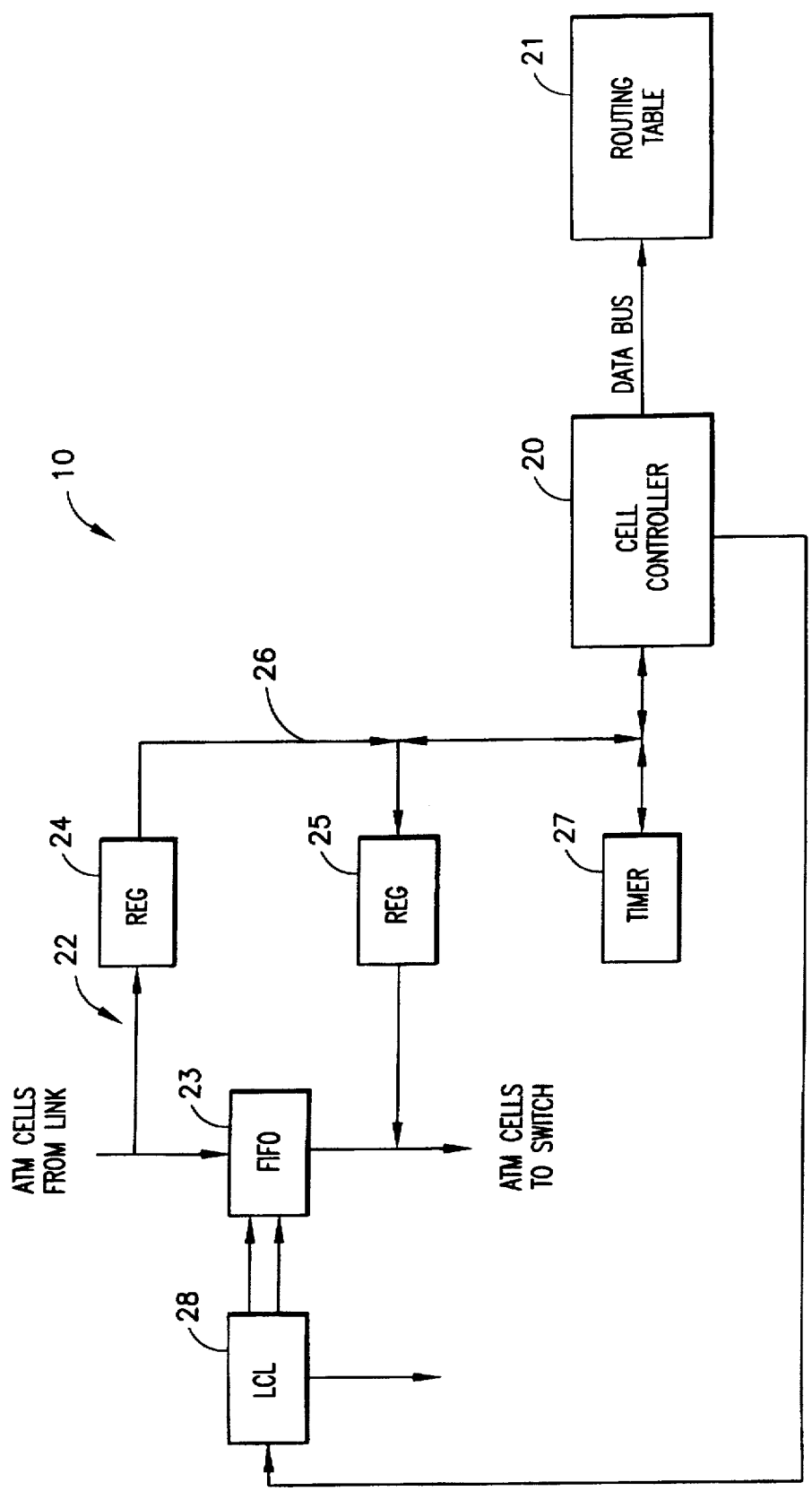
FIG. 2 is a block diagram of a switch; in accordance with one embodiment of the invention.

Referring to FIG. 2, a link controller 10 of an ATM cell switch is shown, with the cell controller device 20 being the heart of the engine performing all arithmetic and logic functions involved in cell processing. This device interfaces to a routing table 21 implemented from 32-bit wide static RAM. This is used to store cell header translations, counts of correctly received, discarded and transmitted cells and "leaky bucket" calculation parameters. The routing table is implemented as a two stage "look-up".

Four independent circuits are used, one to control the flow of ATM cells on each of two links in each direction, all being controlled by one cell controller. Only one of these circuits, an input stage 22, is illustrated in FIG. 2 for the sake of clarity. Each circuit consists of a FIFO (first in first out) register 23 which allows the flow of cells to continue while a header is being processed. Separate registers 24 and 25 are used for storing the received and amended 32-bit cell headers for each link in each direction. These registers 24 and 25 reorder the bits in the 4 byte ATM cell header so that the VCI field occupies bits 15 to 0, the VPI field is bits 27 to 16, and the CLP bit and payload type field are bits 31 to 28 respectively. The registers are connected to a common peripheral bus 26 and connected to the cell header processor device 20.

A 32-bit timer 27, also connected to the peripheral data bus 26, is used for time-stamping each of the cells to enable the leaky bucket processing to be performed. The actual cell processing is performed in the cell controller device 20 containing a number of processing elements which may operate in parallel and which are dedicated to ATM cell processing. Link control logic 28 controls the handling of the cell, in particular the reading and writing of the cell header, and its storing in and reading out from the FIFO 23.

Referring to FIG. 3, the main features of the ATM cell controller 20 are as follows: The time is determined as a 32-bit value to prevent aliasing; where the time difference is more than a 16-bit value, it will be seen as small instead of the true higher value, if only 16-bit time values are used. As a first step, the time difference is tested. The time value is input from the peripheral data bus via an input/output (i/o) register 31, and the old time value is read from the Routing Table RAM 21 (FIG. 2) via a second i/o register 32.

Figure 1:
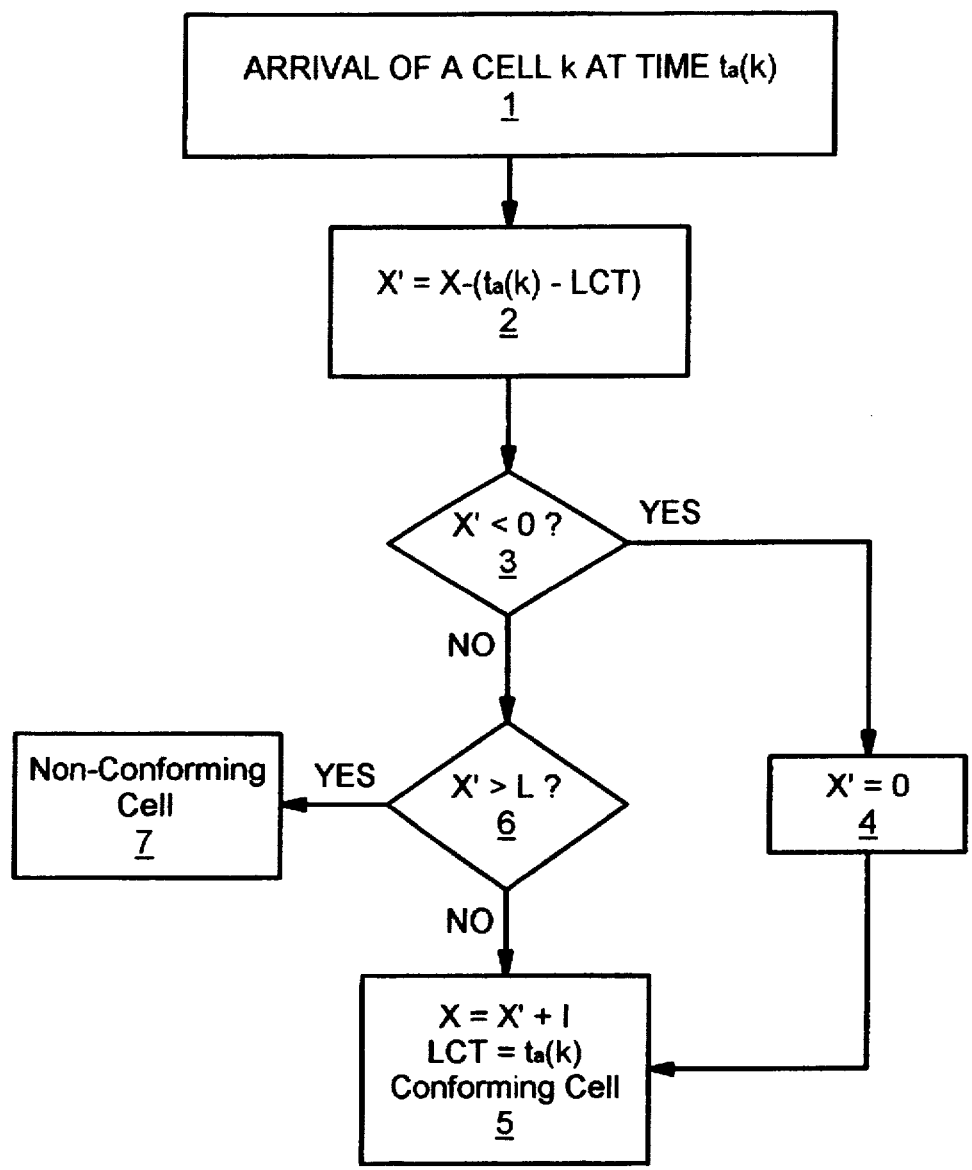
FIG. 1 is a flow diagram illustrating the conventional operation of a leaky bucket in an ATM switch.

Two 16-bit adder/subtractors 33 and 34 are used to calculate the time interval (16 least significant bits) between the reception of two cells on the same connection (State 2 in FIG. 1). They also allow two 16-bit buckets to be processed simultaneously. One of these adders 33 (on the least significant half of the data bus) is also used for adding the actual cell VCI to the VCI pointer during the routing table look-up. The 32-bit values are then split so that the lower 16-bits are considered by a first adder/subtractor device 33, while the upper 16-bits are considered by a second adder/subtractor device 34. These adder/subtractor devices 33 and 34 are configured so as to be able to perform alternatively A+B or A−B operations. Initially both devices carry out a subtraction. For the upper 16-bits, the second adder/subtractor device 34 gives a 0 or 1 result, which is considered together with the result from the first device 33. There are two possible results for a valid number: if the upper difference is 0 and the lower result is positive; and if the upper difference is 1 and the lower result is negative. Any other result is invalid, and all the buckets are zeroed. If a valid time difference is produced in this operation, the result is stored in a time difference register 38. If the time difference is greater than 65536 time units then the timer is said to have "expired" and the interval is considered so great that the cell is conforming in all buckets, and they are all zeroed.

The bucket values are then calculated. Firstly, the 16-bit current bucket values for the respective buckets are read from the Routing Table RAM via the i/o register 32 and fed to the A-inputs of the adder/subtractor devices 33 and 34 via multiplexers 33c and 34c. The identical stored 16-bit time difference is then fed from the register 38 to the B-inputs of the same adder/subtractors via multiplexers 33a and 34a. In each adder/subtractor an A−B subtraction operation is carried out for the respective bucket and the results are stored in the pre-loadable counters 35 and 36 respectively. If the negative flag output (bucket overflow) 33b or 34b is set to true, the respective register 35 or 36 is set to zero. This zeros the bucket value if it would have been negative. (States 3 and 4 in FIG. 1.)

In the next step, the respective bucket maximum values for the two buckets are read from the Routing Table RAM via the i/o register 32 into the A-inputs of the adder/subtractors 33 and 34, via multiplexers 33c and 34c, and the bucket values from the registers 35 and 36 are fed to the respective B-inputs via multiplexers 33a and 34a, and a further A−B operation is carried out in each adder/subtractor. (State 6 in FIG. 1.) These results are not written to the registers; instead the values of the negative flag outputs 33b and 34b are considered. These show whether either of the buckets has overflowed or not—if the value is negative, overflow has occurred.

For the cell to be eligible for a particular bucket, the CLP bit for the cell must correspond to the bucket control register bit for the bucket and, for a cascaded bucket, the cell must not have been discarded by a previous bucket. Control logic 39 determines the eligibility of the cell in each of the buckets, conformance/non-conformance in each bucket and any CLP tagging. There are three possible outcomes of the bucket processing: (1) The bucket is not applicable for the cell, so the cell is passed unchanged (States 3, 6, 7 of FIG. 1); (2) The cell is conforming (negative flag 33b or 34b not set during state 6 of FIG. 1) and either the time has expired or the bucket level test result is not negative; (3) The cell is non-conforming if the bucket is valid and the conformance test fails. The control logic 39 also controls tagging via the cell header translation logic 40, described hereinafter. The inputs to the control logic 39 are the negative flags 33b and 34b, and an input from the Routing Table via the register 32. The outputs go to all the multiplexers and registers to control their operation; the links are omitted for the sake of clarity.

The increment value is read from the Routing Table RAM via the i/o register 32 and the multiplexers 33c and 34c to the A-inputs of the adder/subtracters 33 and 34, while the current bucket values are fed back into the B-inputs from counters 35 and 36. The A and B-inputs are then added together and the results are stored in the counters 35 and 36 if the cell is conforming (State 5 in FIG. 1). The 16-bit new bucket values are then written to the Routing Table RAM through the multiplexer 37 and via the i/o register 32.

The new time, which is the time value when the time difference was calculated is then written from the register 31 via the adder/subtracter A-inputs (while the B-inputs select zero), with the result being written to the counters 35 and 36 respectively. Again, the two 16-bit values are multiplexed through the multiplexer 37 and written to the Routing Table RAM via the i/o register 32 to provide the time stamp.

The cell header translation logic 40, comprising 32×2-input AND gates, 32×2-input OR gates, 32×4 to 1 multiplexers, and a 32 bit register, ANDs the stored header with a masking parameter from the Routing Table and then ORs the result with a new value parameter to translate the header for the next stage of the connection. This new value of the cell header is read from the register in 40 through the i/o register 31 to be stored in the register 25 (FIG. 2) to be appended to the front of the cell stored in the FIFO 23.

A comparator 30 is used to identify OAM (operations and maintenance) cells in a virtual path connection, i.e. with a VCI address of 0003h or 0004h, 0006h or 0007h, and to flag such OAM cells to by-pass the leaky bucket processing.

Independent adder/subtractor devices 33 and 34 allow the parallel buckets to operate independently. All bucket processing is performed on 16-bit integer values. Since the buckets operate "two in parallel", the results of the buckets are available more quickly than in conventional processors, where the buckets are processed sequentially.

Figure 4B:
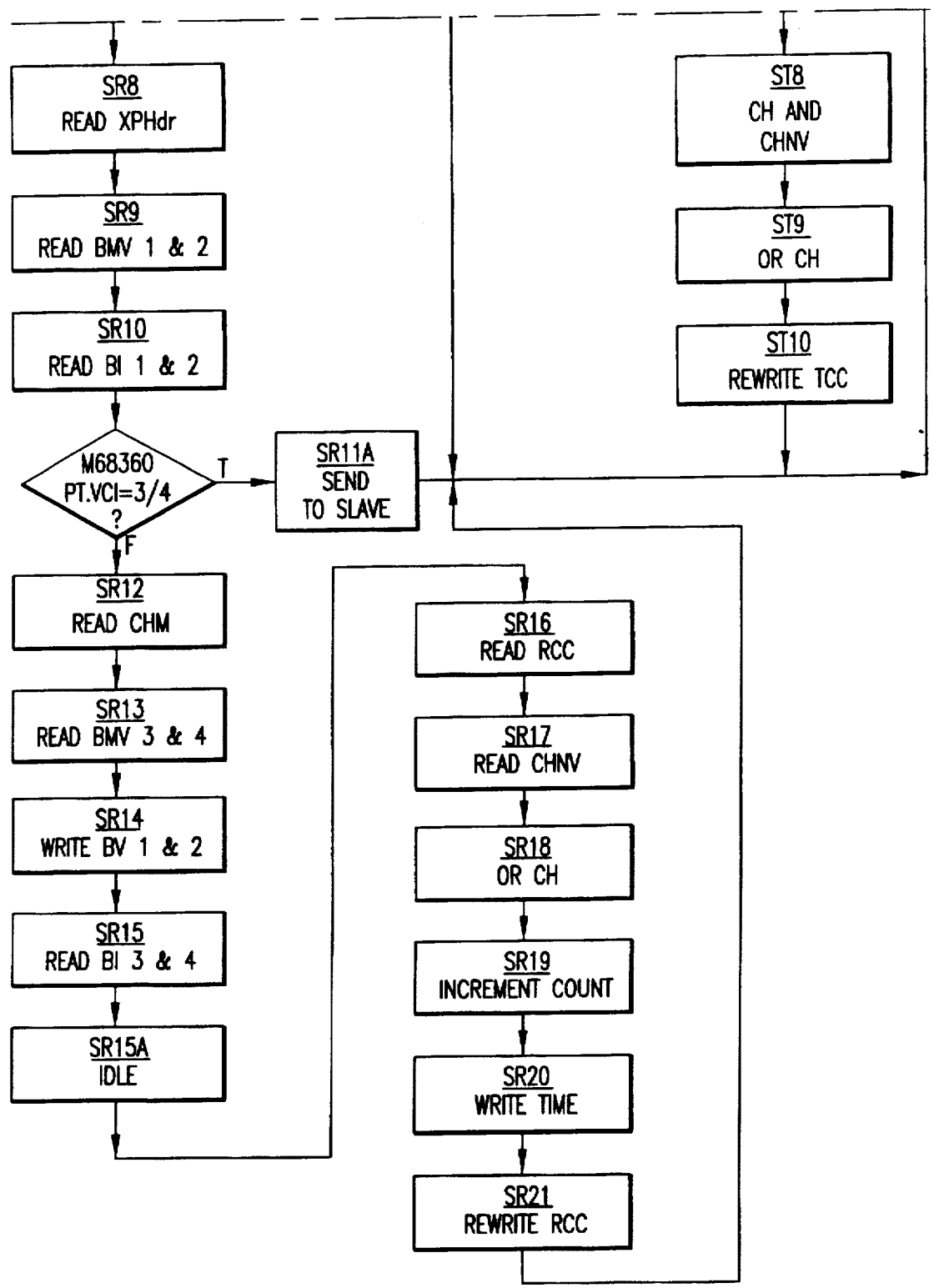
FIG. 4 is a flow diagram representing the operation of the processor of FIG. 3.

FIG. 4 represents the ATM cell processing algorithm accomplished at least partially in the cell processor described hereinbefore with reference to FIG. 3. The sequence of steps in the algorithm, identified by the reference letters and numbers on the Figure, is as follows:

S0) Cell headers read from the incoming ATM cell are copied into the appropriate cell header registers 24 (FIG. 2). A flag is generated by control logic 28 and sent to the ATM processor device 20 (FIG. 3) to indicate that a cell request is pending.

Receiver

SR1) The VPI from the cell header stored in 40 (FIG. 3) is output via the multiplexer 42 and output register 43 as the address for the VCI pointer entry. The VCI pointer is stored in i/o register 32.

SR2) The VCI Range value is read. This is used to indicate whether there is a valid entry in the routing table for the cell header being processed. One control bit in this entry will indicate if this is a virtual path entry, meaning that the VCI will be ignored. A second control bit "discard" can be set to discard all entries for this particular VP. The VCI pointer is read from the i/o register 32 through the multiplexer 42 to be stored in the address register 41.

SR3) The VCI pointer is applied from the Routing Table to the A-input of the adder/subtractor 33 and the cell VCI from the register in 40 is applied to the B-input, and the sum is routed through output multiplexer 42 to the input of the address register 41, but is only stored in the register if it is not a VP connection.

SR4) Idle State. The cell VCI value is compared with the allowed range for this particular VP to ensure that there is a valid entry.

SR5) The 32 bit time value of the last successful cell on the connection is read.

SR5a) If the VCI is not in range or the discard bit is set then this state is entered to discard an invalid cell.

SR6) The Bucket Control Register is read. This determines which type of traffic (CLP0 or CLP1 or both) each of the different leaky bucket algorithms will operate on. It also determines whether CLP0 cells which exceed a bucket rate will be discarded or converted to CLP1 cells.

SR7) The 1st/2nd Bucket Value is read. This 32 bit word is the current value of the first and second leaky buckets (bit 0 to bit 15 is the first bucket value, bit 16 to bit 31 is second bucket value). Also the time difference between the current time and time stamp of the last cell (read in SR5) is calculated. Two independent 16 bit subtractors (33 and 34) are used. Only the 16 least significant bits of the time difference is used in the bucket calculations. If the 16 most significant bit calculation exceeds a value of one then the time difference is said to have expired. (the two cells were so far apart that all relevant buckets will be zeroed and the cell admitted).

SR8) The Switch Fabric Header (XP Hdr.) is read. This value is used to determine the routing of the cell within the ATM switch. Certain control bits also indicate whether the cell should be sent to the slave processor or if it should be discarded (invalid VCI value).

SR9) The 1st/2nd Bucket Maximum value is read from the Routing Table RAM. This 32 bit word is split between first and second leaky buckets in a similar way to the 1st/2nd bucket value. The 16 bit adder/subtracters (33 and 34) subtract the 16 bit time difference (calculated in SR7) from the 1st/2nd Bucket Value.

SR10) The 1st/2nd Bucket Increment is read from the Routing Table RAM. Again, this 32 bit parameter is the increments for first and second leaky buckets.

SR11) The 3rd/4th Bucket Value is read from the Routing Table RAM. These are the current values for the third and fourth leaky buckets, split in a similar way. The new 1st/2nd Bucket Values are subtracted from the 1st/2nd Maximum Values (33 and 34) and a flag is set (for each relevant bucket) to indicate any overflow.

SR11a) This state is entered if the cell is to be sent to the Slave processor. This is done if the relevant bit in the XP Hdr. is set (SR8) or if it is an OAM (Operation and Maintenance) cell.

SR12) The Cell Header Mask value is read. The result of the 1st/2nd bucket calculations (or zero if negative) are added to the increment values, if valid for the cell type (Bucket Control Register) and if a conforming cell entered the bucket.

SR13) The 3rd/4th Bucket Maximum value is read, again from the Routing Table RAM. This is the maximum value for the third and fourth leaky buckets. The time difference is subtracted from the current bucket values. The cell header is ANDed with the mask value.

SR14) The 1st/2nd Bucket Values are written back.

SR15) The 3rd/4th Bucket Increments are read. These are the increments for the third and fourth leaky buckets. The 3rd/4th Bucket new values are subtracted from the Maximum values, and independent flags are set according to relevant bucket overflow.

SR15a) This is an idle state to allow the results of the 3rd and 4th buckets to be assessed.

SR16) The Receive Cell Count is read, or if the cell has been rejected by one of the buckets the receive overflow count is read. This value will be incremented and re-written if the cell is accepted.

SR17) The Cell Header New Value is read. The 3rd/4th Bucket Value (or zero, if it is negative) is added to the increment value, if valid for the cell type (Bucket Control Register) and if a conforming cell entered the bucket.

SR18) The Cell Header is ORed with the new value.

SR19) The relevant results of the 3rd/4th (second and third leaky buckets) are re-written. The Received Cell count is incremented.

SR20) The Current 32 bit Time is written to the routing table and the new cell header is written to the cell header register.

SR21) The Received Cell Count is re-written, and the state machine then returns to idle. The cell is admitted unless discarded by one of the buckets.

Transmitter

ST1) The VPI from the cell header stored in 40 (FIG. 3) is output via the multiplexer 42 and output register 43 as the address for the VCI pointer entry. The VCI pointer is stored in i/o register 32.

ST2) The VCI Range value is read. This is used to indicate whether there is a valid entry in the routing table for the cell header being processed. One control bit in this entry will indicate if this is a virtual path entry, meaning that the VCI will be ignored. A second control bit "discard" can be set to discard all entries for this particular VP. The VCI pointer is read from the i/o register 32 through the multiplexer 42 to be stored in the address register 41.

ST3) The VCI pointer is applied from the Routing Table to the A-input of the adder/subtractor 33 and the cell VCI from the register in 40 is applied to the B-input, and the sum is routed through output multiplexer 42 to the input of the address register 41, but is only stored in the register if it is not a VP connection.

ST4) Idle State. The cell VCI value is compared with the allowed range for this particular VP to ensure that there is a valid entry.

ST5) The Transmit Cell Count is read. Two values are used, one for the CLP0 cells and one for the CLP1 cells.

ST5a) If the VCI is not in range or the discard bit is set, then this state is entered to discard an invalid cell.

ST6) The cell discard control bits are read from the Routing Table.

ST7) The Cell Header Mask value is read.

ST8) The Cell Header New Value is read and the Mask is ANDed with the cell header (40, FIG. 3).

ST9) The Cell Header is ORed with the New Value.

ST10) The Transmit Cell count is re-written, the cell is discarded if the "discard" bit is set, and the cell header is written to the cell header register. The state machine returns to the idle state.

I claim:

1. An ATM cell switch comprising a plurality of data input/output link controllers connected to external data links, each link controller comprising a leaky bucket processor to monitor and control cell flow rates, the leaky bucket processor comprising timer means for timing the arrival of each ATM cell, and calculating means to calculate the time interval between the reception of two consecutive cells on the same connection, means for storing a predetermined regular bucket increment, means for determining from the calculated time interval and from the predetermined regular bucket increment the resultant level in the bucket, and means for comparing the resultant level in the bucket with a predetermined maximum level and, if the maximum level will be exceeded, for discarding, or changing the Cell Loss Priority of, the current cell, wherein the leaky bucket processor includes means for performing the calculation of the resultant bucket level for a pair of buckets simultaneously.

2. An ATM cell switch according to claim 1, wherein the leaky bucket processor comprises means for carrying out the following steps upon receipt of a cell on a connection:

a) simultaneously recalculate the level values for a pair of different buckets in parallel;
   b) determine for each of the buckets whether the predetermined level has been exceeded;
   c) determine whether each bucket is valid for the current cell;
   d) determine whether the increment value should be added to the bucket value before writing back the new value to the bucket; and
   e) determine whether the cell is to be discarded and, if not, whether the Cell Priority is to be changed.

3. An ATM cell switch according to claim 1, wherein the timer means provides 32-bit time values, and the time difference is calculated using only the 16 least significant bits.

4. An ATM cell switch according to claim 1, wherein the leaky bucket processor comprises two 16-bit adder/subtractors to calculate the time interval between the reception of two cells on the same connection, and two magnitude comparators to compare the new levels of the buckets with the maximum permitted levels and to signal that the cell should be discarded if the maximum permitted level would be exceeded by inclusion of that cell.

5. An ATM cell switch according to claim 1, wherein a first bucket is arranged to monitor peak cell flow rates and a second bucket is arranged to monitor average cell flow rates.

6. A method of leaky bucket processing in an ATM cell switch, the method comprising:

a) simultaneously recalculating the level values for a pair of different buckets in parallel;
   b) determining for each of the buckets whether the predetermined level has been exceeded;
   c) determining whether each bucket is valid for the current cell;
   d) determining whether the increment value should be added to the bucket value before writing back the new value to the bucket; and
   e) determining whether the cell is to be discarded and, if not, whether the Cell Priority is to be changed.

* * * * *